(No Model.)

J. W. SPANGLER.
BROADCAST FERTILIZER DISTRIBUTER.

No. 350,164. Patented Oct. 5, 1886.

WITNESSES
C. H. Ourand
Harry Y. Davis

INVENTOR
Jacob W. Spangler
by Wm. H. Fincken
his Attorney.

N. PETERS, Photo-Lithographer, Washington, D. C.

UNITED STATES PATENT OFFICE.

JACOB W. SPANGLER, OF YORK, PENNSYLVANIA.

BROADCAST FERTILIZER-DISTRIBUTER.

SPECIFICATION forming part of Letters Patent No. 350,164, dated October 5, 1886.

Application filed March 17, 1886. Serial No. 195,543. (No model.)

*To all whom it may concern:*

Be it known that I, JACOB W. SPANGLER, a citizen of the United States, residing at York, in the county of York and State of Pennsylvania, have invented certain new and useful Improvements in Broadcast Fertilizer-Distributers, of which the following is a full, clear, and exact description.

This invention is designed to afford an effective machine for distributing, or, as it is termed, "sowing" or "spreading" fertilizer broadcast, and is more particularly intended for use in connection with lime.

The invention is comprehended, briefly, in a wheeled machine having suitable feeding devices, which project the fertilizer from a hopper onto a board adapted to be raised or lowered, by which it is distributed, scattered, or spread broadcast in quantity, manner, and to the extent desired, as will be hereinafter more particularly set forth and claimed.

Figure 1:
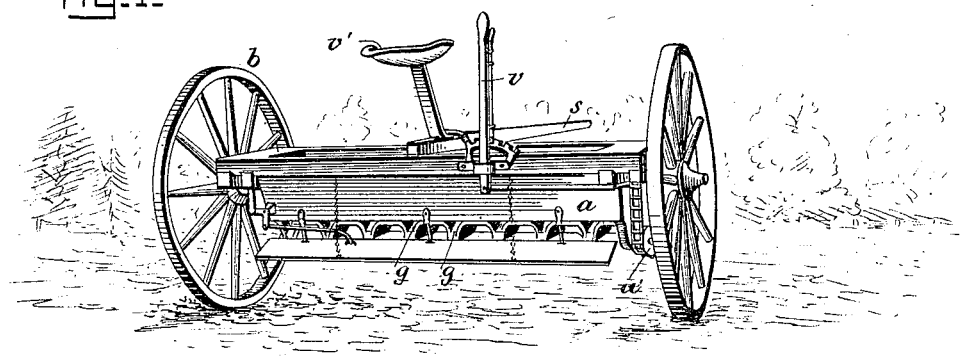
Figure 2:
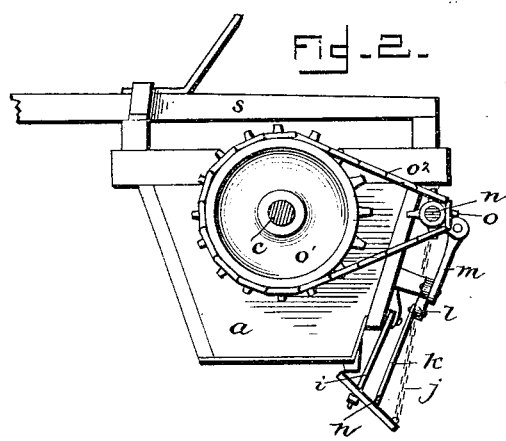
Figure 3:
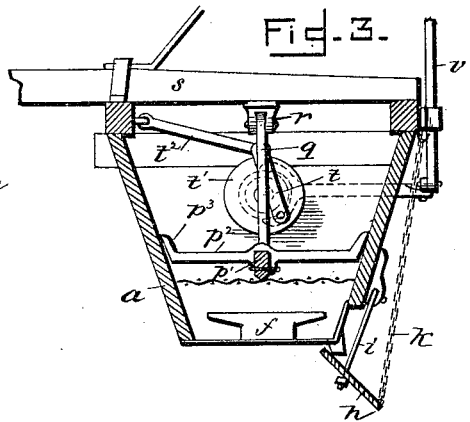
Figure 4:
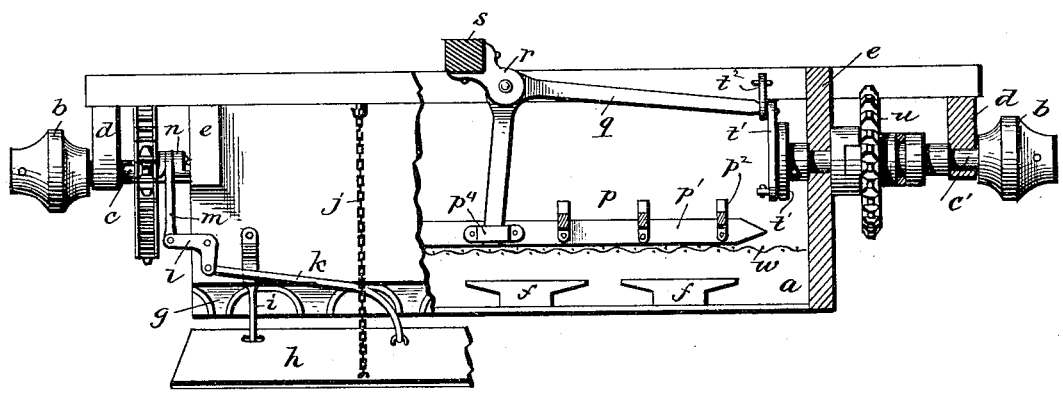

In the accompanying drawings, in the several figures of which like parts are similarly designated, Figure 1 is a rear perspective view of a machine embodying my invention. Fig. 2 is an elevation of the left-hand end of the hopper. Fig. 3 is a vertical cross-section, looking toward the right-hand end; and Fig. 4 is a partial longitudinal section and rear elevation of part of the hopper and its appurtenances, the last three figures being on a larger scale than Fig. 1.

The hopper $a$ may be of approved construction, but differs from any to me known in being hung between the wheels from their axles, instead of being mounted above such axle. By hanging the hopper as first mentioned the hopper is brought nearer the ground, and hence the fertilizer as discharged has a shorter fall, and is far less liable to be unevenly spread and wind-driven than when the hopper is elevated above or upon an axle passing through or just beneath its bottom. One very good mode of hanging the hopper according to my invention is to provide the wheels $b$ with short axles $c\ c'$, to which they are made fast and with which they revolve, said axles being secured in bearings (the details of which are not shown, the same not being of this invention) provided in the framing $d\ e$ at the ends of the hopper.

The hopper is provided with any desired number of "feeders," $f$, so called, and outlets $g$ therefor, the feeders being herein shown by dummies, which may represent, for example, the feeders shown in my United States Letters Patent No. 233,040, 256,249, 261,569, or 296,239, and although I do not limit the utility of this invention to any particular kind of feeder I prefer those technically known as "force-feed." At the rear of the hopper, and just below or on a line with the outlets, I arrange a shaker-board, $h$, secured to the hopper by hangers $i$ made fast to the hopper and loosely jointed to the board, as by passing their ends through slots in the board and securing them by nuts on the under side, as indicated in the drawings. The inclination of this shaker-board is varied to suit the condition of the fertilizer, as wet or dry, pulverulent or sticky, by chains $j$ or equivalent devices attached to the board and adjustable, as on hooks on the hopper. This board is given a constant reciprocating motion lengthwise while the spreading is going on by any suitable means. One efficient mechanism for this purpose consists, as shown, of an arm, $k$, loosely connected to the board by one end and jointed at its other end to a bell-crank lever, $l$, secured to a bracket attached to the hopper, and this bell-crank lever is vibrated by a pitman, $m$, connected to a crank eccentric or crank-shaft, $n$, supported in the framing of the hopper, said device $n$ being rotated from the axle $c$ by suitable gearing or connections—as, for example, the chain-wheels $o\ o'$ and chain $o^2$. This shaking board $h$ insures the distribution broadcast of the fertilizer fed to it from the hopper.

In order to insure against the agglomeration of the fertilizer in the hopper, an agitator, $p$, may be employed. The agitator I prefer consists of a bar, $p'$, of nearly the length of the hopper, having attached to it a number of arms, $p^2$, extending across the hopper, and provided with upturned ends $p^3$, which bear loosely against the side walls of the hopper, and so insure the proper position of the agitator. This agitator is laid loosely in the hopper above the feeders and resting upon them, if desired, and is reciprocated by an elbow-lever or bell-crank, $q$, conveniently pivoted to a bracket, $r$, which may be secured to the tongue $s$. The short arm of this lever is loosely connected to the bar $p'$ by a socket-piece, $p^4$, so that should the agitator be raised by, for instance, a lump of the material being fed getting under it the lever offers no resistance, but simply slips through the socket-piece $p^4$—that is to say, the agitator, by means of this socket-piece, rides up the arm of the bell-crank without affecting its movement otherwise. The long end of this lever $q$ is connected to a pitman, $t$, which is eccentrically pinned to a disk or its equivalent, $t'$, on the inner end of the axle $c'$, which, rotating, vibrates said lever. A link, $t^2$, extends from the pitman-connection with the lever to the hopper, and is loosely held thereto, so as to insure a vertical rectilinear motion of the lever. By this construction of the agitator it will be seen that it may be very readily removed at pleasure. A grid or grating, $w$, of crossed metal bars, coarse wire-netting, or other construction may be interposed between the feeders and agitator to catch any lumps or stones too large to be passed by the feeders, such grating being secured in any suitable manner in the hopper. The axle $c'$ has a gear-wheel, $u$, connected by a clutch mechanism of ordinary construction to turn with or upon it, and this clutch mechanism may be controlled by a lever, $v$, in convenient reach from the driver's seat $v'$. I have indicated such a clutch mechanism and operating-lever, but deem it unnecessary to explain them in detail, the construction being common. The wheel $u$ is geared to a second wheel, $u'$, on the feeder-driving shaft, as usual, and the clutch mechanism enables me to control the feed. Change-wheels or other devices may be employed to vary the speed of feed.

For the sake of clearness in the drawings, I have shown the agitator and grating rather higher from the feeders than in practice will be the case. Usually both the grating (when it is employed) and the agitator will be immediately above the feeders, so as to prevent the massing of the fertilizer around them, and the proportionate length of the arms $p^2$ will be accordingly.

The hopper may be supported upon a continuous axle arranged in the same relation as the two separate axles, instead of such last-named axles, either or both of the wheels being fast or loose on the axles, as required, and if loose adapted, by clutches or otherwise, for connection with the sprocket or chain wheels on the axle.

What I claim is—

1. A machine for spreading lime and fertilizer broadcast, comprising a hopper having suitable feeders for ejecting the fertilizer from the same and a shaker-board arranged, substantially as set forth, to receive the material to be distributed from the outlets of said hopper and discharge it rearwardly of the hopper, substantially as described.

2. A hopper of substantially the type shown and described, provided with the feeders, combined with a board adjustably and movably hung at the rear of the outlets of said hopper and means to impart a reciprocating shaking motion to said board in the direction of its length, substantially as set forth.

3. A wheeled hopper and feeders therein, combined with a board movably and adjustably hung in the rear of said hopper in line with its outlets, a crank or its described equivalent, and connections for the same with a source of motion and the said board, substantially as described.

4. A hopper, combined with supporting-wheels and their independent and disconnected axles arranged at or near the top of the hopper, at opposite sides, substantially as described.

5. An agitator comprising a bar provided with lateral arms and adapted to be placed loosely in a hopper and loosely connected to its motive power, so as to rise and fall independently of it, substantially as described.

6. In a fertilizer-distributer, a removable agitator provided with a socket, $p^4$, combined with an elbow-lever, $q$, loosely fitted in said socket, a vibrator for said lever, and means to keep it in a vertical path, substantially as described.

7. A hopper and its laterally-projecting frame, combined with supporting-wheels and their axle arranged in bearings in or upon the said laterally-projecting frame at or near the top of the hopper, substantially as described.

In testimony whereof I have hereunto set my hand this 11th day of March, A. D. 1886.

JACOB W. SPANGLER.

Witnesses:
JONATHAN JESSOP,
WALTER B. WHITE.